(12) United States Patent
Bansal et al.

(10) Patent No.: US 7,712,092 B2
(45) Date of Patent: May 4, 2010

(54) BINARY TRANSLATION USING PEEPHOLE TRANSLATION RULES

(75) Inventors: Sorav Bansal, New Delhi (IN); Alex Aiken, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 8 days.

(21) Appl. No.: 12/069,755

(22) Filed: Feb. 12, 2008

(65) Prior Publication Data

US 2008/0172657 A1 Jul. 17, 2008

Related U.S. Application Data

(60) Provisional application No. 60/997,235, filed on Oct. 1, 2007.

(51) Int. Cl.
G06F 9/45 (2006.01)
G06F 9/455 (2006.01)
G06F 9/30 (2006.01)

(52) U.S. Cl. ............. 717/153; 717/138; 712/208; 703/26

(58) Field of Classification Search ............ None
See application file for complete search history.

(56) References Cited

U.S. PATENT DOCUMENTS 5,930,509 A * 7/1999 Yates et al. ............ 717/159
6,091,897 A 7/2000 Yates et al.
6,535,903 B2 3/2003 Yates et al.
6,820,255 B2 11/2004 Babaian et al.
7,076,769 B2 7/2006 Baraz
2004/0181785 A1 9/2004 Zwirner et al.
2004/0194070 A1 * 9/2004 Baraz ............... 717/136
2005/0235271 A1 * 10/2005 Sanyal et al. ......... 717/136

OTHER PUBLICATIONS

Davidson, Jack W. and Christopher W. Fraser, "Automatic Generation of Peephole Optimizations," Proceedings of the 1984 SIGPLAN Symposium on Compiler Construction, Jun. 17-22, 1984, pp. 111-116.*
Massalin, Henry, "Superoptimizer: A Look at the Smallest Program," Proceedings of the 2nd International Conference on Architectual Support for Programming Languages and Operating System, Oct. 5-8, 1987, pp. 122-126.*
Fraser, Christopher W. and Alan L. Wendt, "Automatic Generation of Fast Optimizing Code Generators," Proceedings of the ACM SIGPLAN 1988 Conference on Programming Language Design and Implementation, Jun. 20-24, 1988, pp. 79-84.*
Bansal, Sorav and Alex Aiken, "Automatic Generation of Peephole Superoptimizers," Proceedings of the 12th International Conference on Architectural Support for Programming Languages and Operating Systems, Oct. 21-25, 2006, pp. 394-403.*

(Continued)

*Primary Examiner*—Michael J Yigdall
(74) *Attorney, Agent, or Firm*—Lumen Patent Firm

(57) ABSTRACT

An efficient binary translator uses peephole translation rules to directly translate executable code from one instruction set to another. In a preferred embodiment, the translation rules are generated using superoptimization techniques that enable the translator to automatically learn translation rules for translating code from the source to target instruction set architecture.

10 Claims, 5 Drawing Sheets

OTHER PUBLICATIONS

Gschwind, Michael et al., "Binary Translation and Architecture Convergence Issues for IBM System/390," Proceedings of the 14th International Conference on Supercomputing, May 8-11, 2000, pp. 336-347.*

Joshi, Rajeev et al., "Denali: A Goal-directed Superoptimizer," Proceedings of the ACM SIGPLAN 2002 Conference on Programming Language Design and Implementation, Jun. 17-19, 2002, pp. 304-314.*

Cifuentes et al., "The Design of a Reasonable and Retargetable Bindary Translator," Proc. Reverse Engineering, Oct. 6-8, 1999, Atlanta, GA, USA., pp. 280-291.

* cited by examiner

BINARY TRANSLATION USING PEEPHOLE TRANSLATION RULES

CROSS-REFERENCE TO RELATED APPLICATIONS

This application claims priority from U.S. provisional patent application No. 60/997,235 filed Oct. 1, 2007, which is incorporated herein by reference.

STATEMENT OF GOVERNMENT SPONSORED SUPPORT

This invention was made with Government support under contract W-7405-ENG-48 awarded by the Department of Energy. The US Government has certain rights in this invention.

FIELD OF THE INVENTION

The present invention relates generally to computer-implemented techniques for translation of binary computer code between distinct instruction set architectures.

BACKGROUND OF THE INVENTION

Current computer microprocessors are designed to execute binary machine code instructions. Because it is burdensome to program directly at the machine code level, computer software is normally written in a high-level programming language which is then converted into executable machine code instructions. As shown in FIG. 9, a high-level source code program 900 may be converted by a compiler 902 into binary machine code 904 which may be executed by a particular type of microprocessor hardware 908. The binary machine code 904 is composed using an instruction set specific to a particular type of microprocessor. This instruction set is part of the microprocessor's instruction set architecture (ISA) 906 which provides the binary code 904 with a functional interface to the microprocessor hardware 908.

In the course of the evolution of microprocessors, various different families of microprocessors have been designed with distinct ISAs. In addition, when microprocessors within a given family evolve, their ISAs often evolve as well. Consequently, binary code 904 that is executable on an existing type of microprocessor 908 and its associated ISA 906 does not necessarily execute on a newer or different type of microprocessor 918 with a different ISA 916. This situation gives rise to the problem of software portability, i.e., allowing legacy software to run on a new or different ISA. One approach to address this software portability problem is to re-compile the high-level source code program 900 using a new compiler 912 designed to generate machine code 914 specific to the different ISA 916. Sometimes, however, the high-level source code is not available or a compiler program 912 for the new ISA 916 is not available. Another technique is to use an emulator program running on the new processor 918 which emulates the old processor 908 and executes the existing binary code 904. As with re-compiling, sometimes an emulator for the new ISA 916 is not available. In addition, emulators often add a significant runtime overhead.

Another approach to addressing the software portability problem is binary translation. Binary translation 910 is a process that directly converts compiled binary machine code 904 from a source ISA 906 to binary machine code 914 on a target ISA 916, without knowledge of any pre-compiled high-level source code 900. Binary translation may be performed dynamically or statically, i.e., on-the-fly as the code is executed or once-and-for-all before execution.

The first binary translators were custom-designed by computer manufacturers to facilitate transition to computers based on new microprocessor hardware. For example, Digital Equipment Corporation used binary translation to migrate users of VAX, MIPS, SPARC and x86 to Alpha. Apple Computer used binary translation to run Motorola 68000 programs on their PowerPC machines. Other applications of binary translation are to provide machine virtualization and to provide forward and backward compatibility between ISA generations.

A common feature in all these binary translation tools is that they are all custom-designed to solve a specific problem and are tightly coupled to the source and target ISAs and operating systems. This type of binary translator requires several man years of development. One of the main challenges in writing a binary translator is dealing with the vagaries of instruction sets of different architectures. The process of manually modeling the instruction semantics and then writing an optimizer to exploit them is daunting, error-prone and unsuitable for scaling to many different architectures. Thus, when a new ISA is created, considerable development effort is required to create a new binary translator for that ISA.

Motivated by the high development cost of custom-designed binary translators, some researchers have proposed a general purpose binary translator that is more easily adaptable to changes in both source and target ISA, i.e., resourceable and retargetable. These general purpose binary translators use an intermediate representation as part of a multi-step translation, i.e., these techniques do not perform direct translation from one ISA to another ISA. For example, FIG. 8 illustrates one such binary translator design. Binary machine code 800 specific to a source ISA is first decoded to an intermediate, machine-independent representation of the program 802, called a register transfer list (RTL). A high-level analysis of this abstract RTL 802 produces an abstract RTL 804, which is then used to generate the translated machine code 806 specific to the target ISA. This approach to general purpose binary translation, however, still requires considerable effort to adapt the translator to a new source or target ISA, i.e., to develop new rules for decoding from the new source ISA to the RTL or for encoding (efficiently) to the new target ISA from the RTL. Moreover, a general purpose binary translator of this type requires a universal RTL language that can capture the peculiarities of all existing ISAs. If a sufficiently different ISA is developed in the future, however, the RTL may need to be redesigned, defeating the purpose of the approach.

Other approaches to binary translation avoid dealing with the complexity of different instruction sets by encoding each instruction as a series of operations in C. This allows support for many source-target pairs. This ease of adaptation, however, is gained only with a significant reduction of performance (typically a factor of five slowdown).

It remains an outstanding problem in the art to provide a binary translator that can be easily adapted to a new source-target architecture pair and also maintain a high level of performance.

Peephole Optimization and Binary Translation

To improve the efficiency of the target ISA machine code, some existing binary translators use code optimization techniques in a post-processing step after translation to the target ISA. For example, peephole optimization is a known technique for locally replacing small sets of computer program instructions ("peepholes") with more efficient instructions (that are not necessarily "optimal") on the same ISA. Traditionally, peephole optimization is implemented using a collection of human-designed pattern matching algorithms or rules to recognize and replace different common types of code patterns. In particular, the use of manually selected peephole optimization rules to optimize the machine code on the target ISA after translation is known. For example, U.S. Pat. No. 6,820,255 presents a technique for binary translation that, after translation is completed, uses peephole optimization rules on the target ISA to optimize the translated code. Because these peephole optimization rules are manually selected, it can take significant time and effort to produce a comprehensive and efficient set of code optimization rules. It is also significant to emphasize that these peephole optimization techniques are used to optimize code on a single, fixed target ISA after translation is completed. They are not part of the binary translation process proper and do not involve code on more than one ISA. These optimization techniques, therefore, do not address the basic challenge of binary translation, which is to ensure both optimal translated code and easy adaptation to new source-target ISA pairs.

SUMMARY OF THE INVENTION

The present invention provides a technique for binary translation that uses peephole translation rules to translate code directly from a source ISA to a distinct target ISA without using an intermediate representation. In contrast with the traditional use of peephole rules for code optimization on a single ISA, the invention uses peephole rules for performing code translation directly from a source ISA to a distinct target ISA. The translation involves nontrivial considerations of state maps of the different ISAs. Superoptimization techniques, or other automated techniques, are preferably used to automatically generate these peephole translation rules. More specifically, the invention preferably employs superoptimization to automatically search and infer an equivalent instruction sequence on the target ISA for a given instruction sequence on the source ISA. Unique features of the invention include performing binary translation using peephole translation rules, the use of automatic techniques to derive peephole translation rules, and the use of Boolean equivalence tests to ascertain equivalence of two instruction sequences on different platforms under a mapping of their corresponding states. Advantageously, this technique typically produces more efficient code than existing binary translation methods. Moreover, it is easy to retarget the technique to different source-target architecture pairs. Applications include virtualization of hardware by seamlessly and efficiently running applications written (or compiled) for one architecture on another.

In one aspect, a computer-implemented method is provided for binary translation from a source instruction set architecture (ISA) to a target ISA distinct from the source ISA. The method includes selecting a set of peephole translation rules corresponding to the source ISA and target ISA pair, i.e., each rule in the selected set maps a source binary instruction sequence executable on the source ISA to corresponding equivalent binary instruction sequence executable on the target ISA. Using the selected set of peephole translation rules, a source binary executable on the first ISA is directly translated to a target binary executable on the second ISA. Preferably, each of the peephole translation rules includes a specification of a register map from a source ISA state to a target ISA state. The binary translation may include choosing a register map for each application of the peephole translation rules, where the choosing is based on a computation of a peephole translation cost and register map switching cost. Preferably, the selected set of peephole translation rules is generated automatically, e.g., using superoptimization techniques. For example, the set of peephole translation rules may be generated by extracting objective instruction sequences from a set of training programs executable on the source ISA, matching the objective instructions sequences with equivalent candidate instruction sequences executable on the target ISA using superoptimization techniques, and generating peephole translation rules from the matches. The equivalent candidate instruction sequences may be determined with consideration to a register map from the source ISA state to the target ISA state.

DETAILED DESCRIPTION

Figure 1:
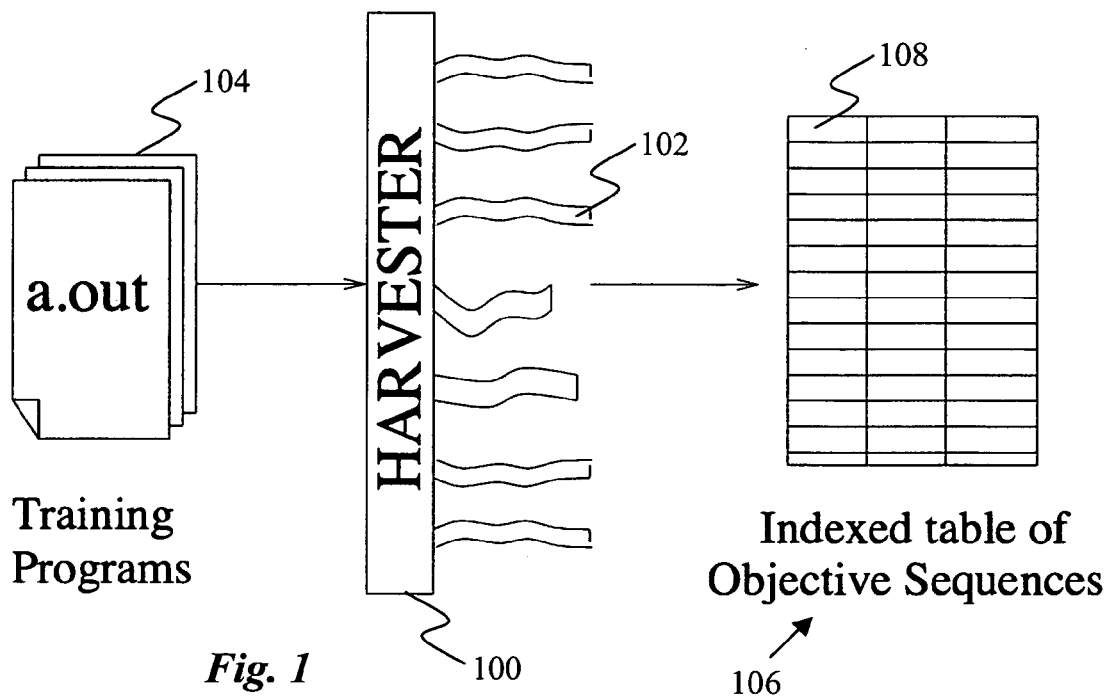
FIG. 1 illustrates a process for extracting instruction sequences from a set of training executable binaries and constructing an indexed data structure of objective instruction sequences, which may be adapted for use with embodiments of the invention.

The present invention provides a binary translator with equal or better performance than existing tools at a fraction of their development cost. For example, using the present invention an effective and useful binary translator may be completed in a few man-months.

The present invention provides a technique for binary translation that uses peephole rules to translate code from one ISA to another. Peephole rules are pattern matching rules that replace one sequence of instructions by another equivalent sequence of instructions. Peephole rules have traditionally been used for compiler-optimizations, where the rules are used to replace a sub-optimal instruction sequence in the code by another equivalent but faster sequence on the same ISA. In contrast with this traditional use of peephole rules for optimization on a single ISA, the present binary translator uses peephole rules for translation between different ISAs, i.e., for replacing an instruction sequence on a source ISA by an equivalent instruction sequence on a target ISA that is distinct from the source ISA. For example, ld[r2]; addi 1; st [r2]=>inc [er3]{r2=er3} is a peephole translation rule from a certain accumulator-based RISC architecture to another CISC architecture. In this case, the rule expresses that the operation of loading a value from memory location [r2], adding 1 to it and storing it back to [r2] on the RISC machine can be achieved by a single in-memory increment instruction on location [er3] on the CISC machine, where RISC register r2 is emulated by CISC register er3.

In contrast with peephole code optimization techniques, binary translation involves mapping the state of one ISA to the state of another ISA, and thus involves non-trivial considerations of the differences between the ISAs. A state map specifies which locations on the target ISA emulate which source ISA locations. The choice of the state map during binary translation has a dramatic effect on the performance of the translated code. To address this challenge, the present inventors have developed an effective way to adaptively choose the state map depending on the usage pattern of a code region currently being translated.

The number of peephole translation rules that are needed to correctly translate a complete binary executable program file for a given source-target architecture can be huge and labor intensive to write manually. To address this challenge, the present invention preferably uses techniques to automatically infer peephole translation rules. Specifically, it preferably uses superoptimization techniques. Similar techniques, called peephole superoptimizers, have been used in the context of compiler optimization, but not for binary translation between distinct ISAs.

The principles of the present invention may be illustrated through an example binary translator from PowerPC ISA to x86 ISA. This example embodiment can successfully translate large executables and libraries. Experimental results performed by the inventors indicate that the translator achieves a median performance of around 90% of natively compiled code on microbenchmarks and 72% of natively compiled code on SPEC benchmarks. To our knowledge, this is the best available PowerPC to x86 binary translator. In many of the benchmarks, the translated code surprisingly outperforms natively-compiled code. These results clearly indicate the usefulness of a binary translation using peephole rules found by superoptimization.

In addition to providing high performance translated code, the binary translators of the present invention are easy to retarget to different source-target architecture pairs.

Peephole Superoptimizers

To better understand the superoptimization techniques used in embodiments of the present invention, we first describe a related technique for peephole superoptimization for code optimization on a single ISA. We then discuss its adaptation to generating peephole translation rules for use in binary translation from one ISA to another.

Peephole superoptimizers operate by first automatically learning peephole optimizations and then applying them to optimize code. For brevity, we shall sometimes refer to a peephole superoptimizer as simply an optimizer.

The optimizer works in three phases. In the first phase, the optimizer extracts objective instruction sequences from a set of training programs. The objective instruction sequences are the ones we seek to optimize. In a first phase of operation, shown in FIG. 1, a harvester 100 extracts instruction sequences 102 from a set of training executable binaries 104 and constructs an indexed data structure 106 of objective instruction sequences 108.

Figure 2:
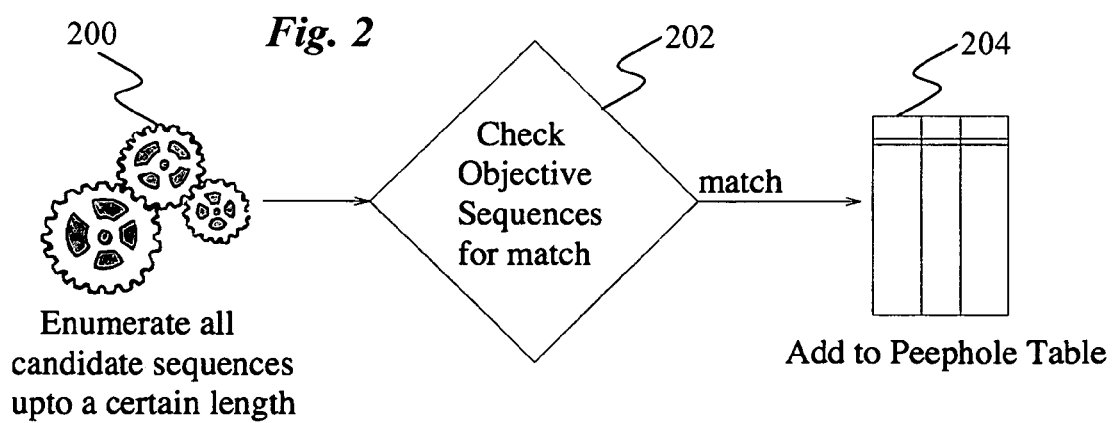
FIG. 2 illustrates a process in which all possible instruction sequences up to a certain length are enumerated, checking if each enumerated sequence is an optimal replacement for any of the objective instruction sequences, which may be adapted for use with embodiments of the invention.

In the second phase, shown in FIG. 2, all possible instruction sequences up to a certain length are enumerated in step 200, checking in step 202 if each enumerated sequence is an optimal replacement for any of the objective instruction sequences. These enumerated sequences are also called candidate sequences. If a faster candidate sequence equivalent to an objective sequence is found, the corresponding matched peephole rule is added to the peephole optimization table 204. A few sample peephole optimization rules are shown in Table 1.

TABLE 1

Examples of peephole rules generated by a superoptimizer while optimizing x86 executables.

| Objective Sequence | Live Registers | Equivalent Candidate Sequence |
| --- | --- | --- |
| movl (%eax), %ecx<br>movl %ecx, (%eax) | eax, ecx | movl (%eax), %ecx |
| sub %eax, %ecx<br>mov %ecx, %eax<br>dec %eax | eax | not %eax<br>add %ecx, %eax |
| sub %eax, %ecx<br>test %ecx, %ecx<br>je .END<br>mov %edx, %ebx<br>.END: | eax, ecx,<br>edx, ebx | sub %eax, %ecx<br>cmovne %edx, %ebx |

In summary, in the second phase an enumerator enumerates all instruction sequences up to a certain length, checking each of them with any of the objective sequences for a match. If a suitable match is found, the corresponding replacement rule is added to the peephole table.

The first two phases involving the construction of the optimization table can be time-consuming (e.g., a few days on a single machine) and are preferably performed only once for a given architecture. Once the optimization table is constructed, it can be applied multiple times to different executables.

Figure 3:
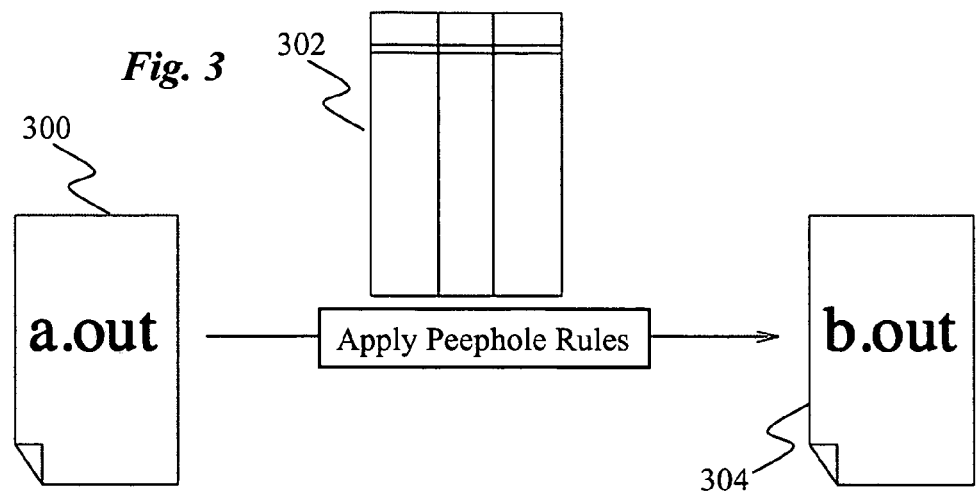
FIG. 3 illustrates the process of applying peephole rules from a set of peephole rules to convert initial executable code to converted executable code, which is adapted for use with embodiments of the invention.

Once the peephole rules are generated, they may be used to perform the actual code optimization. As shown in FIG. 3, the peephole rules from the peephole table 302 are used to convert the initial executable code 300 to the optimized executable code 304. The application of the peephole optimization table 302 to the executable 300 typically completes within a few seconds.

A key goal in constructing the optimizer is to make it more effective by scaling to long instruction sequence lengths. This is primarily achieved by effective pruning of the enumerated search space and implementation of fast equivalence tests. Two main techniques are used to reduce the search space, namely canonicalization and pruning. The equivalence test is performed in two stages: a fast execution test and a slower Boolean test. The execution test is implemented by executing the two sequences on hardware and comparing their outputs on random inputs. The Boolean test is implemented by first representing an instruction sequence by a Boolean formula, then expressing the equivalence relation as a satisfiability constraint and finally solving the satisfiability constraint using a SAT solver.

Using these techniques, all length-3 x86 instruction sequences can be enumerated on a single processor in less than two days. The superoptimizer is capable of handling opcodes involving flag operations, memory accesses and branches. On most architectures, that would cover almost all opcodes. Equivalence of instruction sequences involving memory accesses is correctly computed by accounting for the possibility of aliasing. The optimizer is also sensitive to liveness information in the context of the instruction sequence. Further details of techniques for automatically generating peephole superoptimizers for code optimization are contained in the paper by the inventors entitled "Automatic Generation of Peephole Superoptimizers," *Proc. ASPLOS '06*, ACM, October, 2006.

3.2 Binary Translation

Next, we discuss how a peephole superoptimizer may be adapted to generate peephole translation rules which may subsequently be used to perform efficient binary translation. The approach is similar to the superoptimization technique discussed above in relation to FIGS. 1 and 2. In this case, however, the objective sequences belong to the source ISA while the candidate sequences belong to the target ISA, which is distinct from the source ISA.

In the first phase, the objective sequences are extracted from source-architecture applications, which are analogous to training programs 104. The enumerator then enumerates candidate instruction sequences on the target architecture checking them for equivalence with any of the objective sequences. The definition of equivalence, however, changes in this new setting where different ISAs are involved. Now, equivalence is meaningful only with respect to a map from one architecture state to another, also called a state map. Since memory and disk is common to all architectures, the state map reduces to a map from the source architecture registers to the destination architecture registers. For this reason, we also call it a register map. Some valid register maps are shown in Table 2.

TABLE 2

Some valid and invalid register maps from PowerPCx86 translation ($M_i$ refers to a memory location).

| Register Map | Description |
|---|---|
| r1→eax | Maps PowerPC register to x86 register |
| r1→$M_1$ | Maps PowerPC register to a memory location |
| $M_s$→eax | Maps a memory location in source code to a register in the translated code |
| r1→eax r2→eax | Invalid. Cannot map two PowerPC registers to the same x86 register |
| $M_s$→$M_t$ | Invalid. It does not make sense to map one memory location to another |

A register in the source ISA could be mapped to a register or a memory location in the target ISA. It is also possible for a memory location in the source ISA to be mapped to a register in the target ISA. The choice of the register map determines the equivalent target sequence for a given source sequence.

During enumeration, all possible register maps are enumerated and a corresponding target sequence searched. We reduce the search space by observing that having once considered a register map, we need never consider a register map that is equal up to a consistent register renaming. In case a match is found, the corresponding peephole translation rule is added to the table of peephole translation rules, analogous to table 204. The peephole rule now has an extra field specifying the register map under which it is valid. Some examples of peephole translation rules are shown in Table 3.

TABLE 3

Examples of peephole translation rules from PowerPC to x86.

| PowerPC Sequence | Live Registers | State Map | X86 Instruction Sequence |
|---|---|---|---|
| mr r1, r2 | r1, r2 | r1→eax r2→ecx | movl %ecx, %eax |
| mr r1, r2 | r1, r2 | r1→eax r2→$M_1$ | movl $M_1$, %eax |
| lwz r1, (r2) | r1, r2 | r1→eax r2→ecx | movl (%ecx), %eax bswap %eax |
| lwz r1, (r2) stw r1, (r3) | r1, r2, r3 | r1→eax r2→ecx r3→edx | movl (%ecx), %eax movl %eax, (%edx) |
| mflr r1 | r1, lr | r1→eax lr→ecx | movl %ecx, %eax |

Once the table of peephole translation rules is generated for a given source-target ISA pair, as described above, it may then be selected and used for binary translation. The method for binary translation follows a process analogous to that shown in FIG. 3 where the translation rules 302 are applied to code 300 to obtain code 304, only in this case the source ISA code is translated to target ISA code. The application of the peephole translation rules, however, is more involved than the application of optimization rules. The translation between ISAs also involves choosing the register map for each code point before generating the corresponding translated code. The choice of register maps can make a visible difference to the performance of generated code. We discuss the selection of optimal register maps at translation time below.

4.1 Choosing a Register Map

While translating a region of code from one ISA to another, a register map needs to be selected to generate equivalent target ISA code from given source ISA code region. Choosing the right register map is crucial to the quality of translation. Moreover, the register map may need to vary from one region of the program to another, i.e., instruction sequences at different program points of one executable may be translated using different register maps. The choice of register map for an instruction sequence at any given point of the program is preferably determined by the cost of the corresponding peephole translation (translation cost) and the cost of switching from the register maps at the predecessor program points (switching cost). The total cost of using a register map at a program point is the sum of the translation and switching costs.

In one embodiment, a dynamic programming problem is formulated to choose the optimal register map at each program point in a given code region. At each code point, all feasible register maps are enumerated. For each enumerated register map, the peephole table is queried for a matching translation and the corresponding translation cost is recorded. The optimal cost of using a register map is then computed by iterating over the possible register maps of the predecessor program point. Let the cost of the $i^{th}$ predecessor map be $P_i$. Then, the optimal cost of the current map M is computed using the formula $$\text{cost}(M) = \min_i (P_i + T + S(P_i, M)),$$

where T is the cost of the peephole translation rule and $S(P_i, M)$ is the cost of switching from register map $P_i$ to register map M. The optimal cost of each enumerated register map is computed and stored before moving to the next program point and repeating the computation. When the end of the code region is reached, the register map with the lowest cost is chosen and its decisions are backtracked to decide the register maps at all preceding program points. For program points having multiple predecessors, we use a weighted sum of the switching costs from each predecessor. To handle loops, we perform two iterations of this computation.

This procedure of enumerating all register maps and then solving a dynamic programming formulation can be computationally expensive and, if not done properly, can blow-up the translation time. Accordingly, a number of standard optimization techniques is preferably used to limit the execution time of this procedure.

4.2 Static Vs Dynamic Translation

Binary translation can either be performed statically (compile-time) or dynamically (runtime). Most existing tools perform binary translation dynamically for its primary advantage of having a complete view of the current machine state. Moreover, dynamic binary translation provides additional opportunities for runtime optimizations. However, dynamic translation imposes an overhead of performing actual translation and book-keeping at runtime. This overhead is especially visible while running small user-interactive applications that are invoked multiple times (e.g., desktop applications). Hence, while dynamic translation has its own advantages, there exist a niche set of important applications that are best handled using static translation. A static translator translates programs offline and can apply more rigorous code optimizations. However, performing faithful static translation is a slightly harder problem since no assumptions can be made about the runtime state of the process.

The present invention may be implemented in either static or dynamic versions. Most of the principles of the invention are equally applicable in both settings, and when they are not, we discuss the two separately.

4.3 Endianness

It is possible for the source and target architectures to have different endianness, i.e., the byte ordering used in accessing and/or storing data may differ (e.g., most significant byte first vs. least significant byte first). We handle this change in endianness by converting all memory reads to target endianness and all memory writes to source endianness. This ensures that memory always follows source endianness while registers follow target endianness. We perform these conversions by emitting byte-swap instructions at every memory access. Since a memory access is usually expensive, these register-only conversion instructions add only a small runtime overhead.

While dealing with source-target architecture pairs with different endianness, special care is required in handling operating system related data structures. In particular, all executable headers, environment variables and program arguments in the program's address space need to be converted from target endianness to source endianness before transferring control to the translated program. This is performed because the source program assumes source endianness for everything while the operating system (OS) writes the data structures believing that the program will assume target endianness. In the dynamic translator, these conversions are performed inside the translator at startup. In the static translator, special initialization code is emitted to perform these conversions at runtime.

4.4 Control Flow Instructions

Like all other opcode instructions, control flow instructions are also translated using peephole rules. Direct jumps in the source code are translated to direct jumps in the target, with the jump destination in the target being appropriately adjusted so that it points to the corresponding translated code destination. To handle conditional jumps, the condition codes of the source ISA need to be faithfully represented in the target ISA. This could sometimes be a challenge, given the divergent condition-code representations used by different ISAs. We discuss this in detail while discussing our implementation for the PowerPC-x86 architecture below.

The handling of indirect jumps is more involved and is done differently for static and dynamic translators. We discuss this in more detail below.

4.5 System Calls

When translating across two different operating systems, each source OS system call needs to be emulated on the target OS. Even when translating across the same operating system on different architectures, many system calls require special handling. For example, some system calls are only implemented for specific architectures. Also, if the two architectures have different endianness, proper endianness conversions are required for all memory locations that the system call could read or write.

There are other relevant issues such as full system versus user-level emulation, address translation, precise exceptions, misaligned memory accesses, interprocess communication, signal handling, etc. In this description, however, our focus is primarily on efficient code-generation. Those skilled in the art can address these other issues based on the teaching and guidance provided in the present description.

5. Implementation

An example of a binary translator according to the principles of the present invention will now be described in further detail for purposes of illustration. This implementation allows PowerPC/Linux executables to run in an x86/Linux environment. The translator is capable of handling almost all PowerPC opcodes (around 150 in all). We have tested our implementation on a variety of different executables and libraries.

The translator has been implemented in C/C++ and O'Caml. Our superoptimizer is capable of automatically inferring peephole translation rules from PowerPC to x86. To test equivalence of instruction sequences, we use zChaff as our back-end Boolean satisfiability problem (SAT) solver. We present our results using the static translator that produces an x86 executable and linking format (ELF) 32-bit binary executable from a PowerPC ELF 32-bit binary. For complete translation, all dynamically linked libraries used by the PowerPC binary must be available at translation time. To our knowledge, this is the first available static PowerPC-x86 binary translator. Below, we discuss some of the implementation issues.

5.1 Endianness

PowerPC is a big-endian architecture while x86 is a little-endian architecture. We handle this change in endianness using the scheme outlined in Section 4.3. For integer operations, there exist three operand sizes in PowerPC: 1, 2 and 4 bytes. Depending on the operand size, the appropriate conversion code is required when reading from or writing to memory. We employ the convenient bswap x86 instruction to generate efficient conversion code.

5.2 Stack and Heap

On Linux, the stack is initialized with envp, argc, and argv, and the stack pointer is saved to a canonical register at load time. On x86, the canonical register storing the stack pointer is esp; on PowerPC, it is r1. When the translated executable is loaded in an x86 environment (in case of dynamic translation, when the translator is loaded), the esp register is initialized to the stack pointer by the operating system while the emulated r1 register is left uninitialized. To make the stack visible to the translated PowerPC code, we copy the esp register to the emulated r1 register at startup. In dynamic translation, this is done by the translator; in static translation, this is done by the initialization code.

The handling of heap requires no special effort since the brk linux system call used to allocate heap space is identical on both x86 and PowerPC.

5.3 Condition Codes

Figure 4:
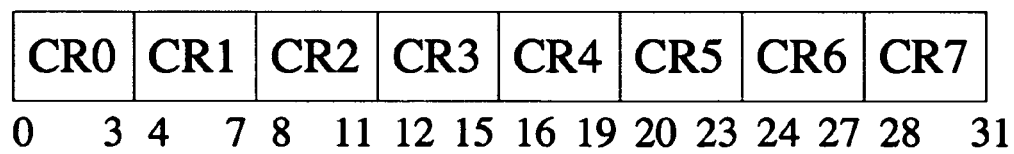
FIG. 4 illustrates condition code registers of the PowerPC architecture.
Figure 4:
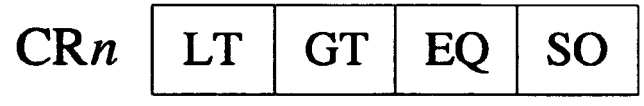
Figure 5:
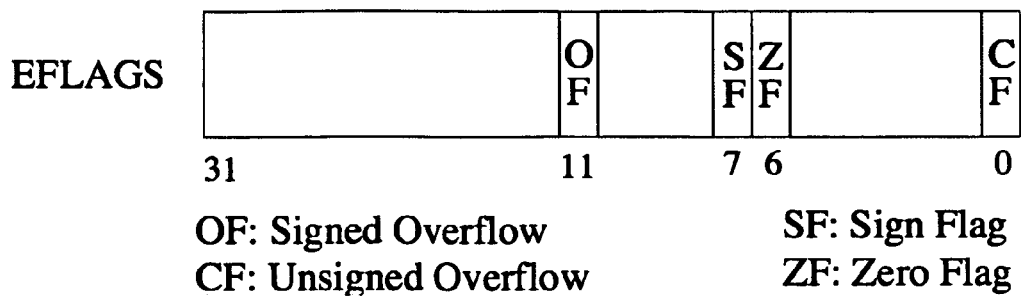
FIG. 5 illustrates condition code registers of the x86 architecture.

Condition codes are bits representing quantities such as carry, overflow, parity, less, greater, equal, etc. PowerPC and x86 handle condition codes in very contrasting ways. FIGS. 4 and 5 show how condition codes are represented in PowerPC and x86 respectively.

While PowerPC condition codes are written using separate instructions, x86 condition codes are overwritten by almost all x86 instructions. Moreover, while PowerPC compare instructions explicitly state whether they are doing a signed or an unsigned comparison and store only one result in their flags, x86 compare instructions perform both signed and unsigned comparisons and store both the results in their condition bits. On x86, the branch instruction then specifies which comparison it is interested in (signed or unsigned). We handle these differences by allowing the PowerPC condition registers (cr0-cr7) to be mapped to x86 flags in the register map. For example, an entry cr0→SF in the register map specifies that, at that program point, the contents of register cr0 are encoded in the x86 signed flags (SF). The translation of a branch instruction then depends on whether the condition register being used ($cr_i$) is mapped to signed (SF) or unsigned (UF) flags.

FIG. 4 illustrates registers of the PowerPC architecture. It has support for eight independent sets of condition codes cr0→cr7. Each 4-bit $cr_n$ register uses one bit each to represent less than (LT), greater (GT), equal (EQ) and overflow-summary (SO). Explicit instructions are required to read/write the condition code bits.

FIG. 5 illustrates registers of the x86 architecture. It supports only a single set of condition codes represented as bits in a 32-bit EFLAGS register. Almost all x86 instructions overwrite these condition codes. The lookup table stores a pointer to the state-map conversion code, which then jumps to the final destination address.

5.4 Indirect Jumps

Jumping to an address in a register (or a memory location) is called indirect jump. An indirect jump is a common construct in modern code. Function pointers, dynamic loading, case statements are all handled using indirect jumps. Since an indirect jump could jump almost anywhere in the executable, it requires careful handling. Moreover, since the destination of the indirect jump could assume a different register-map than the current one, the appropriate conversion needs to be performed before jumping to the destination. We use different approaches to deal with an indirect jump in our static and dynamic binary translators.

Handling of an indirect jump in a dynamic translator is simpler. Here, on encountering an indirect jump, we relinquish control to the translator. The translator then performs the state-map conversion before transferring control to the x86 address corresponding to the destination address of the jump instruction.

The handling of an indirect jump in a static translator is more involved. Here, we first identify all instructions that can be possible indirect jump targets. Since almost all well-formed executables use indirect jumps in only a few different code paradigms, it is possible to identify all possible indirect jump targets by scanning the executable. We scan the read-only data sections, global offset tables and instruction immediate operands and use a set of thumb rules to identify possible indirect jump targets. A lookup table is then constructed to map these jump targets (which are PowerPC code addresses) to their corresponding translated x86 addresses. However, as we need to perform register-map conversion before jumping to the destination x86 address at runtime, we replace the x86 addresses in the lookup table with the address of a code fragment that performs the register-map conversion before jumping to the destination x86 address. We illustrate this scheme in FIG. 6.

Figure 6:
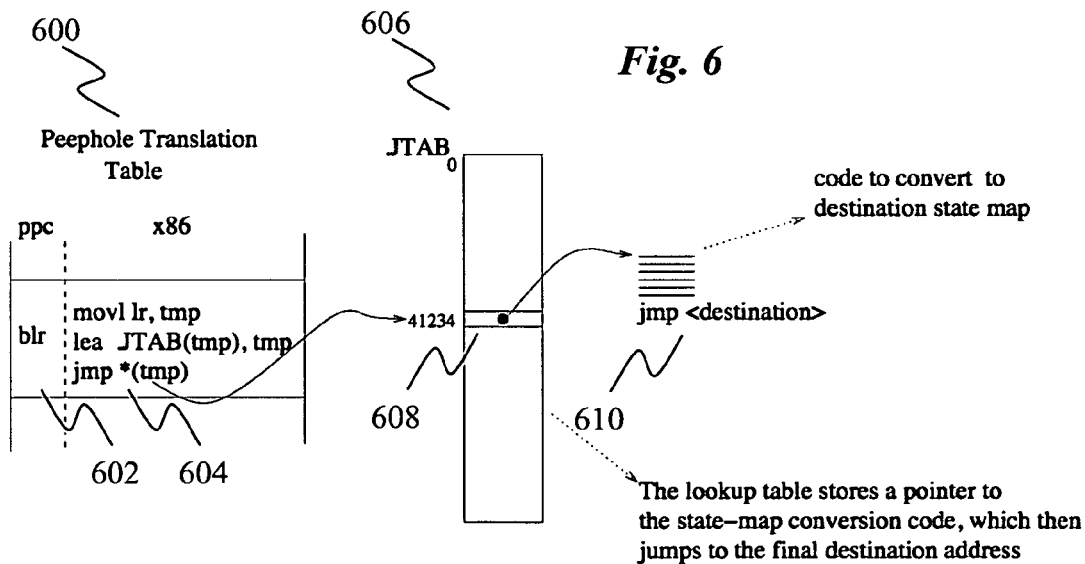
FIG. 6 illustrates a technique for handling of indirect jumps in a static binary translator according to the invention.

FIG. 6 illustrates a technique for handling of indirect jumps in a static binary translator according to the invention. Using a peephole translation table 600, an indirect jump 602 is translated to a table lookup and a jump 604 to the corresponding address. The lookup table 606 stores a pointer 608 to a code fragment 610 that first performs state-map conversion before jumping to the translated code.

The translation of an indirect jump involves a table lookup and some register-map conversion code. While the table lookup is fast, the register-map conversion may involve multiple memory accesses. Hence, an indirect jump is usually an expensive operation. Here, we would like to point out that although the thumb rules used to identify possible indirect jump targets work extremely well in practice, they are prone to adversarial attacks. It would not be difficult to construct an executable that tricks these rules causing a valid PowerPC program to crash on x86. Hence, in an adversarial scenario, it would be wise to avoid these thumb rules and conservatively assume that all code addresses are possible indirect jump targets. Doing so would result in a larger lookup table and more conversion code fragments. This will increase the overall size of the executable but will have no effect on its runtime (apart from possible cache effects).

5.5 Function Calls and Returns

Function calls and returns are handled in very different ways in PowerPC and x86. Table 4 lists the instructions and registers used in function calls and returns for both architectures.

TABLE 4

Function call and return instructions in PowerPC and x86 architectures

| PowerPC | x86 | Comparison |
|---|---|---|
| bl | call | bl (branch-and-link) saves the instruction pointer to register lr while call pushes it to stack |
| blr | ret | blr (branch-to-link-register) jumps to the address pointed to by lr, while ret pops the instruction pointer from the stack and jumps to it |

We implement function calls in PowerPC architecture by emulating the link-register (lr) like any other PowerPC register. On a function call (bl), the link register is updated with the value of the next PowerPC instruction pointer. A function return (blr) is treated just like an indirect jump to the link register. We use the same lookup-table based approach to handle the blr instruction.

The biggest advantage of using this scheme is its simplicity. However, it is possible to improve the translation of the blr instruction by exploiting the fact that blr is always used to return from a function. For this reason, it is straightforward to predict the possible jump targets of blr at translation time (it will be the instruction following the function call bl). This information can be used to avoid the extra memory reads and writes required for register map conversion in an indirect jump.

5.6 Register Name Constraints

Another interesting challenge while translating from PowerPC to x86 is dealing with instructions that operate only on specific registers. Such instructions are present on both PowerPC and x86. Table 5 shows some such x86 instructions.

TABLE 5

Examples of x86 instructions that operate only on certain fixed registers.

| Opcode | Registers | Description |
| --- | --- | --- |
| Mul reg32 | eax, edx | Multiplies reg32 with eax and stores the 64-bit result in edx:eax. |
| div reg32 | eax, edx | Divides edx:eax by reg32 and stores result in eax. |
| Any 8-bit insn | eax, ebx, ecx, edx | 8-bit operations can only be performed on these four registers |

To be able to generate peephole translations involving these special instructions, the superoptimizer is made aware of the constraints on their operands during enumeration. If a translation is found by the superoptimizer involving these special instructions, the generated peephole rule encodes the name constraints on the operands as register name constraints. These constraints are then used by the translator at code generation time.

5.7 Self-Referential and Self-Modifying Code

We handle self-referential code by leaving a copy of the source architecture code in its original address range for the translated version.

To deal with self-modifying code and dynamic loading, we invalidate the translation of a code fragment on observing any modification to that code region. We achieve this by trapping any writes to code regions and performing the corresponding invalidation and re-translation. For a static translator, this involves making the translator available as a shared library.

5.8 Untranslated Opcodes

In our experiments, the translations for certain opcodes may not always be inferred automatically by the superoptimizer due to the bounded length of generated candidate instruction sequences. In these cases, we allow human additions to the peephole table. Typically, very few manual additions to the table are needed to complete it.

5.9 Compiler Optimizations

An interesting observation while doing our experiments was that certain compiler optimizations often have an adverse effect on the performance of our binary translator. For example, an optimized PowerPC executable attempts to use all the 8 condition-registers (cr0-r7). However, since x86 has only one set of flags, other condition registers need to be emulated using x86 registers causing extra register pressure. Another example of an unfriendly compiler optimization is instruction scheduling. An optimizing PowerPC compiler staggers apart two instructions involving a data dependency in order to minimize pipeline stalls, while our binary translator would like the data-dependent instructions to be together to allow the superoptimizer to suggest more aggressive optimizations.

Finally, we would like to point out that while there exist these architecture-specific issues, bulk of the translation and optimization complexity is still hidden by the superoptimizer.

6. Experimental Results

We performed our experiments using a Linux machine with a single Intel Pentium 3.0 GHz processor, 1 MB L1-cache and 4 GB of memory. On the Intel platform, we used version 4.0.2 to compile the executables. On the PowerPC platform, we used gcc version 3.4.1 (due to lack of access to a gcc-4.x cross compiler). All the executables were linked statically and hence, the libraries were also converted from PowerPC to x86 at translation time.

Figure 7:
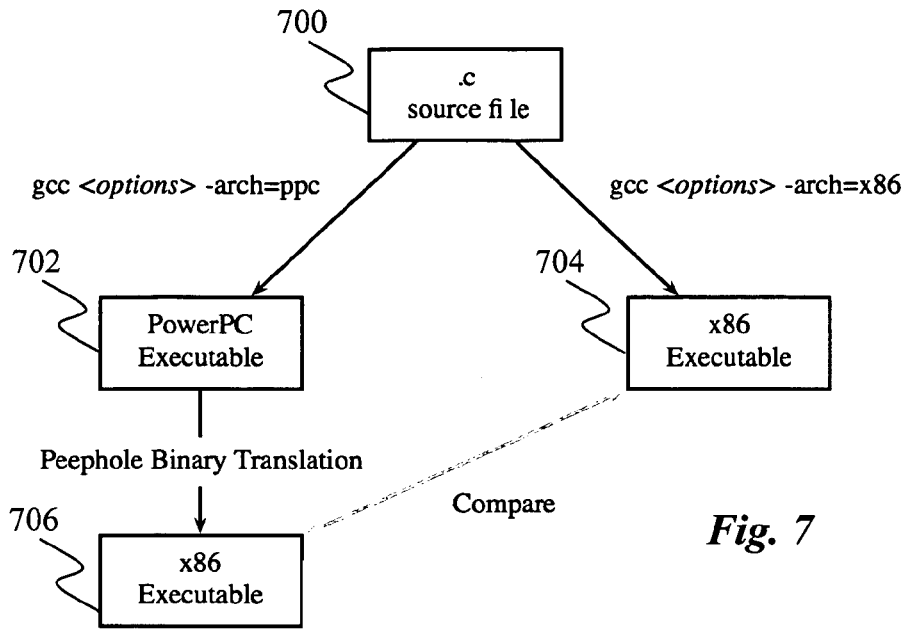
FIG. 7 illustrates an experimental setup for evaluating the performance of translated code produced using an illustrative embodiment of the present invention.
Figure 8:
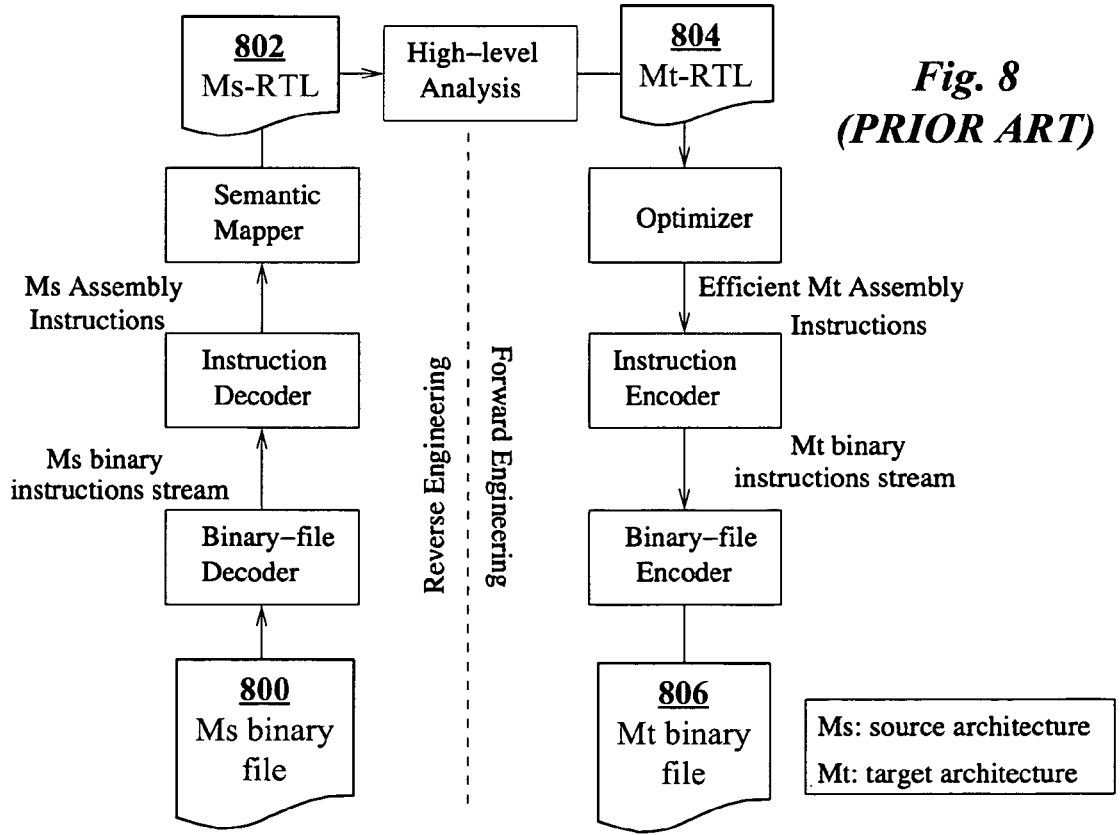
FIG. 8 illustrates a prior binary translator design that uses an intermediate, machine-independent representation to perform translation.
Figure 9:
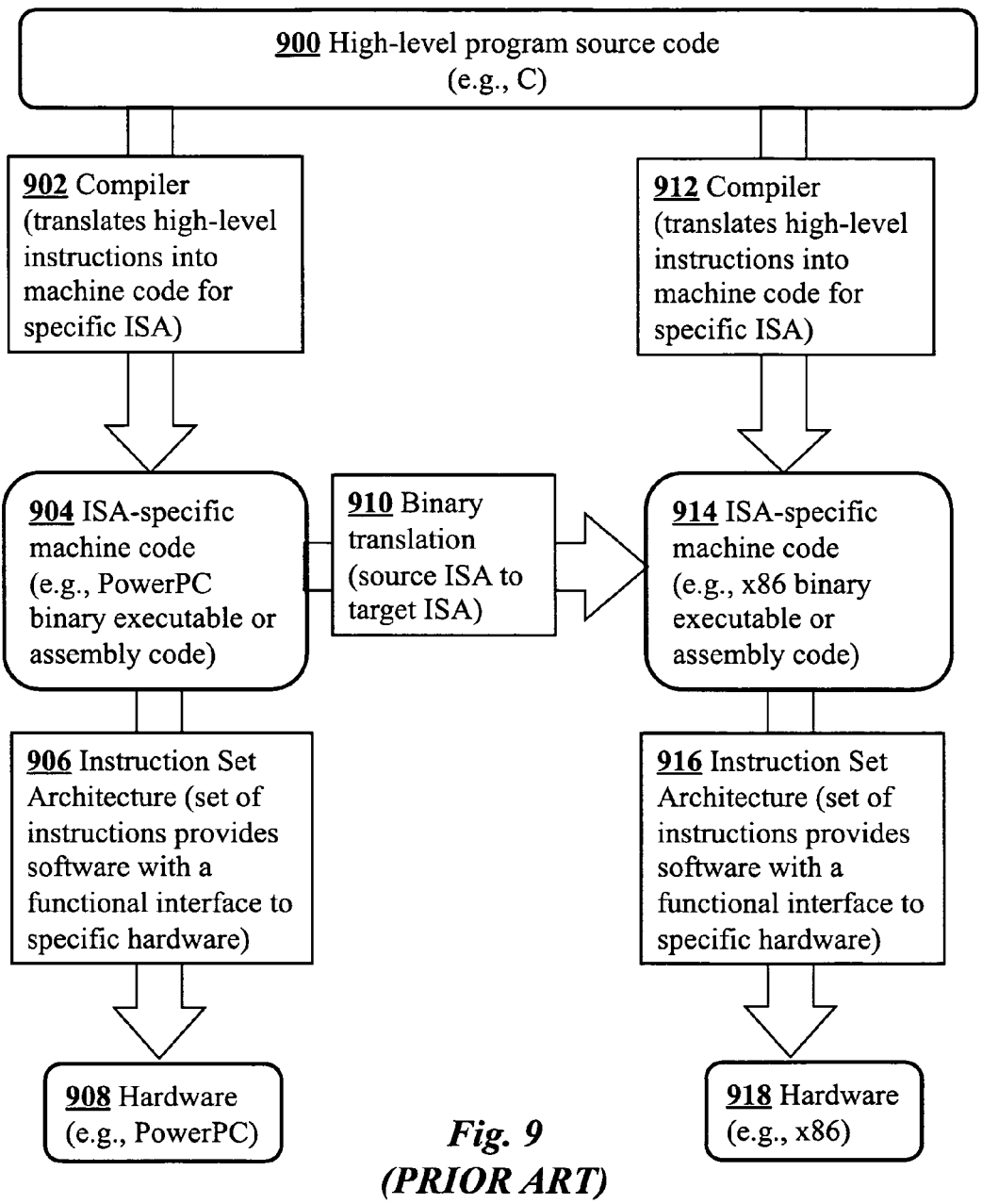
FIG. 9 is a schematic diagram providing an overview of binary translation.

FIG. 7 illustrates an experimental setup for testing an illustrative embodiment. A program 700 composed in C is compiled to a PowerPC executable 702 and x86 executable 704. We compile from the C source for both PowerPC and x86 platforms using gcc. Exactly the same compiler optimization options are used for both platforms. An x86 executable 706 is then produced by our binary translator from the PowerPC executable 702. The natively-compiled x86 executable 704 is then compared with the translated executable 706 for performance.

One might expect the performance of the translated executable 706 to be strictly lower than that of the natively-compiled executable 704. To get an idea of the state-of-the-art in binary translation, let us look at two modern binary compilers. A general-purpose open-source emulator, Qemu, provides 10-20% (i.e., a factor of 5-10 slowdown) of the performance of a natively-compiled executable. A recent commercially available tool by Transitive Corporation claims typically about 70-80% of the performance of a natively-compiled executable. Both Qemu and Transitive are dynamic binary translators.

We first test the performance of our binary translator on small computationally-intensive microbenchmarks. Table 6 lists the results. In our microbenchmarks, we use three well-known sorting algorithms, three different algorithms to solve the towers of Hanoi problem and one benchmark that computes the Fibonacci sequence. All these programs are written in C. They are all highly computationally intensive and hence designed to stress-test the performance of binary translation.

TABLE 6

Performance of the binary translator on some computationally-intensive microbenchmarks.

| Benchmark | Description | -O0 | -O2 | -O2+ |
| --- | --- | --- | --- | --- |
| fibo | Compute first few Fibonacci numbers | 109.89% | 316.89% | 127.78% |
| quicksort | Quicksort on 64-bit integers | 71.84% | 92.51% | 90.23% |
| mergesort | Mergesort on 64-bit integers | 66.51% | 83.08% | 84.35% |
| bubblesort | Bubble-sort on 64-bit integers | 62.37% | 64.12% | 64.86% |
| hanoi1 | Towers of Hanoi Algorithm 1 | 78.77% | 66.25% | 61.96% |
| hanoi2 | Towers of Hanoi Algorithm 2 | 104.69% | 161.94% | 143.69% |
| hanoi3 | Towers of Hanoi Algorithm 3 | 93.81% | 116.03% | 80.15% |

The translated executables perform roughly at 90% of the performance of a natively-compiled executable on average. Some benchmarks perform as low as 64% of native performance and many benchmarks outperform the natively compiled executable. The latter was a surprise to us. For unoptimized executables, the binary translator often outperforms the natively compiled executable. This is because the superoptimizer performs optimizations that are not seen in an unoptimized natively compiled executable. The bigger surprise occurs when the translated executable outperforms an already optimized executable (columns -02 and -02+) indicating that even mature optimizing compilers today are not doing the best possible.

A striking result is the performance of the fibo benchmark in the -02 column where the translated executable is almost three times faster than the natively-compiled and optimized executable. On closer inspection, we found that this is because gcc, on x86, uses one dedicated register to store the frame pointer by default. Since the binary translator makes no such reservation for the frame pointer, it effectively has one extra register. In the case of fibo, the extra register avoids a memory spill that is present in the natively compiled code causing the huge performance difference. Hence, for a more equal comparison, we also compare with the '-fomi-frame-pointer' gcc option on x86 (-02+ column).

Next, we evaluate our translator on SPEC integer benchmarks. The results are tabulated in Table 7. The translator was able to run one benchmark (mcf) at near native speed (97% for -02). For bzip2, around 70% of the native performance was possible. For gzip, we achieved a performance of around 77% of native for the unoptimized executable and 61% of native for the optimized one. For parser, the performance is close to 60-65% of native.

TABLE 7

Performance of the binary translator on SPEC CINT2000 benchmark applications.

| Benchmark | Description | -00 | -02 | -02+ |
|---|---|---|---|---|
| gzip | Data Compression Utility | 76.69% | 61.09% | 59.51% |
| mcf | Minimum Cost Network Flow Solver | 88.16% | 96.79% | 99.35% |
| parser | Natural Language Processing | 63.30% | 59.53% | 58.41% |
| bzip2 | Data Compression Utility | 72.26% | 70.11% | 67.70% |

The superoptimizer currently uses a peephole size of at most two PowerPC instructions. The x86 instruction sequence in a peephole rule can be larger and is typically 1-3 instructions long. Each peephole rule is associated with a cost which captures the approximate cycle cost of the x86 instruction sequence.

We compute the peephole table offline only once for every source-target architecture pair. The computation of the peephole table can take up to a week on a single processor. On the other hand, applying the peephole table to translate an executable is fast (for example, a few minutes for a SPEC benchmark). Currently, there are around 750 distinct translation rules in the peephole table. Given more time and resources, it would be straightforward to scale the number of peephole rules by running the superoptimizer on longer length sequences. More peephole rules are likely to give better performance results.

The size of the translated executable is roughly 5-6x larger than the source PowerPC executable. Of the total size of the translated executable, roughly 40% is occupied by the translated code, 20% by the code and data sections of the original executable, 25% by the indirect jump lookup table and the remaining 15% by other management code and data. Due to the bloat in code size of the translated executable, static translation of very large source executables would require splitting the translated executable into multiple dynamically-loadable objects.

In both Table 6 and Table 7, the columns represent the optimization options given to gcc. '-02+' expands to '-02-fomit-frame-pointer. '-02+' omits storing the frame pointer on x86. On PowerPC, '-02+' is identical to '-02'. The performance is shown relative to a natively compiled application (the performance of a natively compiled application is 100%).

Discussion

In the face of stagnating clock frequencies today, there is a pressing need to find new ways to improve hardware performance. Most computer architects, however, are burdened to support legacy instruction sets as that is the only way to ensure software availability for their new chips. Effective binary translation has the potential to bridge this gap between software and hardware and fuel innovation in computer architecture. To realize this vision of complete hardware-software independence, the binary translator must excel on the two criteria of portability and performance. In older systems, either the binary translator was too tightly coupled with a single architecture or it produced code with poor performance. The present invention provides a solution.

A completely user-transparent solution requires runtime binary translation. Performing translation dynamically at runtime provides more optimization opportunities like profiling, trace-optimization, and speculation. On the other hand, it constrains the amount of time that can be spent in actual translation. In our binary translator, the application of peephole translation rules is very fast. The bulk of translation time is spent in choosing the optimal register map at each program point. In a runtime setting, it would be wiser to first choose register maps arbitrarily resulting in extremely fast translation, and then optimize the register maps only for the hot regions in the source executable.

In conclusion, the present invention provides an efficient and portable scheme to perform effective binary translation. The binary translation is performed using peephole translation rules. These rules may be generated using a superoptimizer that automatically learns translations from one architecture to another. We demonstrate through experiments, that our superoptimization-based approach results in equal or better performance than existing tools at a fraction of their development cost.

The invention claimed is:

1. A computer-implemented method for binary translation from a source instruction set architecture (ISA) to a target ISA distinct from the source ISA, the method comprising:
   a) selecting a set of peephole translation rules stored on a computer readable medium, wherein each rule in the set maps a source binary instruction sequence executable on the source ISA to corresponding equivalent binary instruction sequence executable on the target ISA; and
   b) using the set of peephole translation rules to directly translate a source binary executable on the first ISA to a target binary executable on the second ISA;
   further comprising:
   using superoptimization to automatically generate the set of peephole translation rules, and
   storing the set of peephole translation rules in the computer readable medium.

2. The method of claim 1 wherein using superoptimization to automatically generate the set of peephole translation rules comprises:

i) extracting objective instruction sequences from a set of training programs executable on the source ISA;

ii) matching the objective instructions sequences with equivalent candidate instruction sequences executable on the target ISA using superoptimization techniques; and iii) generating peephole translation rules from the matches.

3. The method of claim 2 wherein the equivalent candidate instruction sequences are determined with consideration to a register map from the source ISA state to the target ISA state.

4. The method of claim 1 wherein each of the peephole translation rules comprises a specification of a register map from the source ISA state to the target ISA state.

5. The method of claim 1 wherein (b) comprises choosing a register map for each application of the peephole translation rules.

6. The method of claim 5 wherein the choosing is based on a computation of a peephole translation cost and register map switching cost.

7. The method of claim 1 wherein selecting the set of peephole translation rules comprises selecting a peephole table previously generated for the source ISA and target ISA.

8. The method of claim 1 further comprising executing instruction sequences of the target binary during translation to implement dynamic binary translation.

9. The method of claim 8 further comprising executing the target binary after translating an entire executable to implement static binary translation.

10. The method of claim 9 wherein (b) comprises accessing a stored lookup table mapping indirect jump target addresses on the source ISA to translated addresses on the target ISA.

* * * * *